United States Patent [19]

Hilker et al.

[11] Patent Number: 4,521,173

[45] Date of Patent: Jun. 4, 1985

[54] APPARATUS FOR MANUFACTURING MAGNET WIRE

[75] Inventors: G. Daniel Hilker; Verne H. Lausen; Jessie H. Coon; James E. Bodette; Jerry L. Grimes; Roger D. Wright; Donny R. Disque; Keith D. Bultemeier, all of Fort Wayne, Ind.

[73] Assignee: Phelps Dodge Magnet Wire Co., New York, N.Y.

[21] Appl. No.: 528,564

[22] Filed: Sep. 1, 1983

Related U.S. Application Data

[62] Division of Ser. No. 258,690, Apr. 29, 1981.

[51] Int. Cl.³ .......... B29F 3/10; B05D 5/12

[52] U.S. Cl. .......... 425/113; 118/405; 264/174; 425/131.1; 427/117

[58] Field of Search .......... 425/113, 114, 131.1; 264/174, 134; 427/117-120; 118/405

[56] References Cited

U.S. PATENT DOCUMENTS

| | | | |
|---|---|---|---|
| 2,584,208 | 2/1952 | Holgren | 425/113 |
| 3,266,091 | 8/1966 | Quear et al. | 425/113 |
| 3,402,696 | 9/1968 | Richards | 425/113 |
| 4,046,103 | 9/1977 | Yakuboff | 425/113 |
| 4,145,474 | 3/1979 | Kertscher et al. | 264/174 |
| 4,165,957 | 8/1979 | Kertscher | 264/174 |
| 4,379,102 | 4/1983 | Kertscher | 264/174 |
| 4,391,848 | 7/1983 | Hilker | 427/117 |

FOREIGN PATENT DOCUMENTS

| | | | |
|---|---|---|---|
| 538698 | 7/1959 | Belgium | 427/117 |
| 920310 | 2/1973 | Canada | 264/174 |
| 2341425 | 10/1977 | France | 264/135 |
| 166263 | 2/1959 | Sweden | 264/174 |
| 178992 | 4/1962 | Sweden | 425/113 |

*Primary Examiner*—Jeffery Thurlow

*Attorney, Agent, or Firm*—David A. Lundy

[57] ABSTRACT

A novel apparatus for manufacturing magnet wire in a continuous process by which coatings of a flowable resin material may be applied concentrically to a moving elongated filament in thickness of about 16 mils or less. The filament can be a bare copper or aluminum conductor having round or rectangular configuration or an insulated conductor upon which a top or an intermediate coat of material is desirably applied. Coatings of one-half mil and one mil also can be applied by the method of the invention. By the apparatus of the invention, magnet wire can be manufactured by continuously drawing the wire to size, annealing the wire, if necessary, insulating the wire with one or more coats of flowable resin material, curing the resin material, if necessary, hardening the resin material, and spooling the wire for shipment, without interruption at speeds limited only by the filament pay-off and take-up devices used. The apparatus of the invention utilizes the flowable resin material to center the filament in a die, the size of the die controls the thickness of the coat to be applied. In the apparatus of the invention, only the resin material being applied to the filament is in contact with the filament. Thus, the mechanical wear normally associated with centering dies used in extrusion processes and like devices is completely eliminated.

14 Claims, 4 Drawing Figures

APPARATUS FOR MANUFACTURING MAGNET WIRE

RELATED APPLICATIONS

This is a divisional application of U.S. patent application Ser. No. 258,690 entitled "METHOD AND APPARATUS FOR MANUFACTURING MAGNET WIRE" filed on Apr. 29, 1981.

BACKGROUND OF THE INVENTION

The invention relates to magnet wire and apparatus for manufacturing magnet wire, and more particularly, to an apparatus for applying a coating of flowable resin material on a continuously moving filament to a desired thickness in a single pass.

Magnet wire has been conventionally manufactured by passing a bare copper or aluminum conductor or a previously insulated copper or aluminum conductor through a bath of liquid enamel (a solution of resin material in a solvent thereof) and through an oven for driving off the solvent from the enamel and/or curing the resin, leaving a resin coat on the conductor.

The application of a coat of material to a filament from solution accounts for all of the magnet wire manufactured today. While some materials using today's technology can only be applied from solution, the cost of the solvent expended in applying resin materials from solution is usually significant. The machinery used in this process is also highly complex and expensive, although the machinery cost is usually not a factor since most of such machinery has been in use for a considerable number of years. Still, the original cost of such machinery is significant for new installations. In addition to the cost of machinery and the solvent expended by such a process, there is the cost of providing and maintaining pollution control equipment; since recently both Federal and State laws have required that the oven stack gases of such machines be essentially stripped of solvent before exhausting the gases to the atmosphere. While various methods of burning the vaporized solvent and/or reclaiming the solvent have been proposed, all such methods result in further expense to the manufacturer.

Additionally, the application of a layer of material to a filament from solution usually requires several successive coats in order to result in a concentric coat of a desired thickness. For example, six coats may be required for a 3 mil coating, although in specific applications as many as 24 coats have been required. Also, multiple coats of certain materials cannot be applied successfully from solution due to a lack of good adhesion and wetting between coats.

It therefore has been desirable for some time to provide an improved method of manufacturing magnet wire which eliminates the use of solvent. Also, it would be additionally highly desirable to provide an improved method of manufacturing magnet wire which would utilize an apparatus of simple design. Also, it would be highly desirable to provide a method of manufacturing magnet wire which would allow the wire to be drawn, coated and spooled in a continuous operation; conventionally the wire is drawn, annealed if necessary, spooled; and then coated and spooled again for shipment. Additionally, it would be highly desirable to provide a method and apparatus which can successfully apply multiple layers of materials which have heretofore not been possible. Finally, it would be highly desirable to provide an improved method and apparatus for manufacturing magnet wire which would not require the use of solvent or pollution control apparatus, or be limited to materials requiring an oven cure, or require multiple coats to obtain a coating of the required continuity and concentricity.

Applying coatings of resinous material by extrusion is substantially less common than applying coatings from solution, since conventional extrusion processes are extremely limited. Coatings of 4 mils and less are either extremely difficult to apply or impossible to apply by conventional extrusion processes. Also, the number of materials which are successfully applied by conventional extrusion processes are extremely limited. Polyvinyl chloride, polyethylene, polypropylene and various elastomeric rubbers comprise 99% of the materials applied by extrusion. These materials are not used in a true magnet wire application, i.e. an electrical winding, the turns of which are insulated to provide low voltage, mechanical, and thermal protection between turns, and do not possess magnet wire properties. In contrast, these materials are conventionally used in lead wire or hook-up wire applications which must protect against the full imput line voltage of an electrical device. Conventionally, extrusion is used in the production of only cables, building wire, and lead or hook-up wire.

While the apparatus used in conventional extrusion processes is relatively simple when compared to a conventional wire coating tower, and the extrusion process can be carried out continuously whereby the filament may be drawn, coated and spooled in a continuous operation, still, a conventional extrusion apparatus is not without problems. Conventional extruders include a centering die, a material reservoir and a sizing die. The centering die mechanically centers the filament in the sizing die, the sizing die determines the exterior dimensions of the coated filament and the thickness of the coat applied to the filament. The primary problem associated with extrusion apparatus is the wear on the centering die. Since the centering die used to center the filament within the sizing die, the centering die must be finely adjusted to achieve a concentric coating and must be replaced periodically due to the wear resulting from the contact between the filament and the die. Centering dies tend to be expensive even when made of hardened steel; but because of the wear that occurs, diamond centering dies have been considered, but not widely used.

Therefore it would be highly desirable to provide an improved apparatus for manufacturing magnet wire which would have all of the benefits of an extrusion process but none of the disadvantages. Such an apparatus would lower the cost of the machinery to manufacture magnet wire and would eliminate the need for solvent, lower manufacturing costs, conserve raw materials and energy, eliminate the need for pollution control apparatus, require less expensive and simpler machinery than now is conventional, and allow for continuous operation from wire drawing to final shipment without being limited to materials from solution or oven cures.

SUMMARY OF THE INVENTION

It is therefore a primary object of this invention to provide an improved apparatus for manufacturing magnet wire.

It is another object of this invention to provide an improved apparatus for manufacturing magnet wire which does not require solutions of insulation material and therefore eliminates the need for solvents, pollution control equipment or for reclaiming solvents from the manufacturing process, lowers the cost of manufacturing at least proportionally to the cost of solvent, and converes energy at least to the degree that energy is required to remove solvents from the insulation material.

It is also another object of this invention to provide an improved apparatus for manufacturing magnet wire which is not limited to the use of insulation material solutions or materials requiring curing after application.

It is another object of this invention to provide an apparatus for manufacturing magnet wire which does not require multiple coats to obtain the required concentricity and/or continuity.

It is another object of this invention to provide an improved apparatus for manufacturing magnet wire in which a coating material can be applied to a continuously moving elongated filament to a desired thickness in a single pass.

It is another object of this invention to provide an improved apparatus for manufacturing magnet wire by which magnet wire can be manufactured at speeds which are limited only by filament pay-off and take-up devices.

It is another object of this invention to provide an improved apparatus for manufacturing magnet wire by which a coat of resin material may be applied to an elongated continuously moving filament to a desired single thickness in a single pass whereby the filament may be drawn or otherwise formed, coated and spooled in a continuous operation.

It is another object of this invention to provide an improved apparatus for manufacturing magnet wire which completely eliminates or substantially reduces the use of solvents thereby eliminating the cost of solvents and the need for pollution control equipment or to reclaim the solvents from the manufacturing process.

It is another object of this invention to provide an improved apparatus for manufacturing magnet wire which completely eliminates the need of highly complex machinery or dies which experience high wear and must be replaced periodically.

It is another object of this invention to provide an improved apparatus of manufacturing magnet wire which has all of the advantages of a conventional extrusion process but is not limited in the thinness of the coating applied to the filament by such a process.

It is another object of this invention to provide an improved apparatus for manufacturing magnet wire having all of the advantages of a conventional extrusion process but none of the disadvantages.

In the broader aspects of the invention, there is provided a novel apparatus for manufacturing magnet wire in a continuous process by which coatings of a flowable resin material may be applied concentrically to a moving elongated filament in thicknesses of about 16 mils or less. The filament can be a bare copper or aluminum conductor having round or rectangular configuration or an insulated conductor upon which a top or an intermediate coat of material is desirably applied. Coatings of one-half mil and one mil also can be applied by the method of the invention. By the apparatus of the invention, magnet wire can be manufactured by continuously drawing the wire to size, annealing the wire, if necessary, insulating the wire with one or more coats of flowable resin material, curing the resin material, if necessary, hardening the resin material, and spooling the wire for shipment, without interruption at speeds limited only by the filament pay-off and take-up devices used. The apparatus of the invention utilizes the flowable resin material to center the filament in a die, the size of the die controls the thickness of the coat to be applied. In the apparatus of the invention, only the resin material being applied to the filament is in contact with the filament. Thus, the mechanical wear normally associated with centering dies used in extrusion processes and like devices is completely eliminated. Further, the apparatus and method of the invention can be used to apply coats several times thinner than is possible with conventional extrusion apparatus and of materials different than those conventionally extruded onto filaments. In specific embodiments using heat softenable materials or melts, curing is no longer required; and thus, the need for curing, catalytic burners and the like as well as all concerns regarding atmospheric pollution are eliminated. The coated filaments and magnet wire made by the apparatus of the invention have coatings which are surprisingly concentric and continuous when compared to magnet wire made by conventional methods and apparatus.

BRIEF DESCRIPTION OF THE DRAWINGS

The above mentioned and other features and objects of this invention and the manner of attaining them will become more apparent and the invention itself will be best understood by reference to the following description of the invention taken in conjunction with the accompanying drawings wherein.

DESCRIPTION OF A SPECIFIC EMBODIMENT

Apparatus

Figure 1:
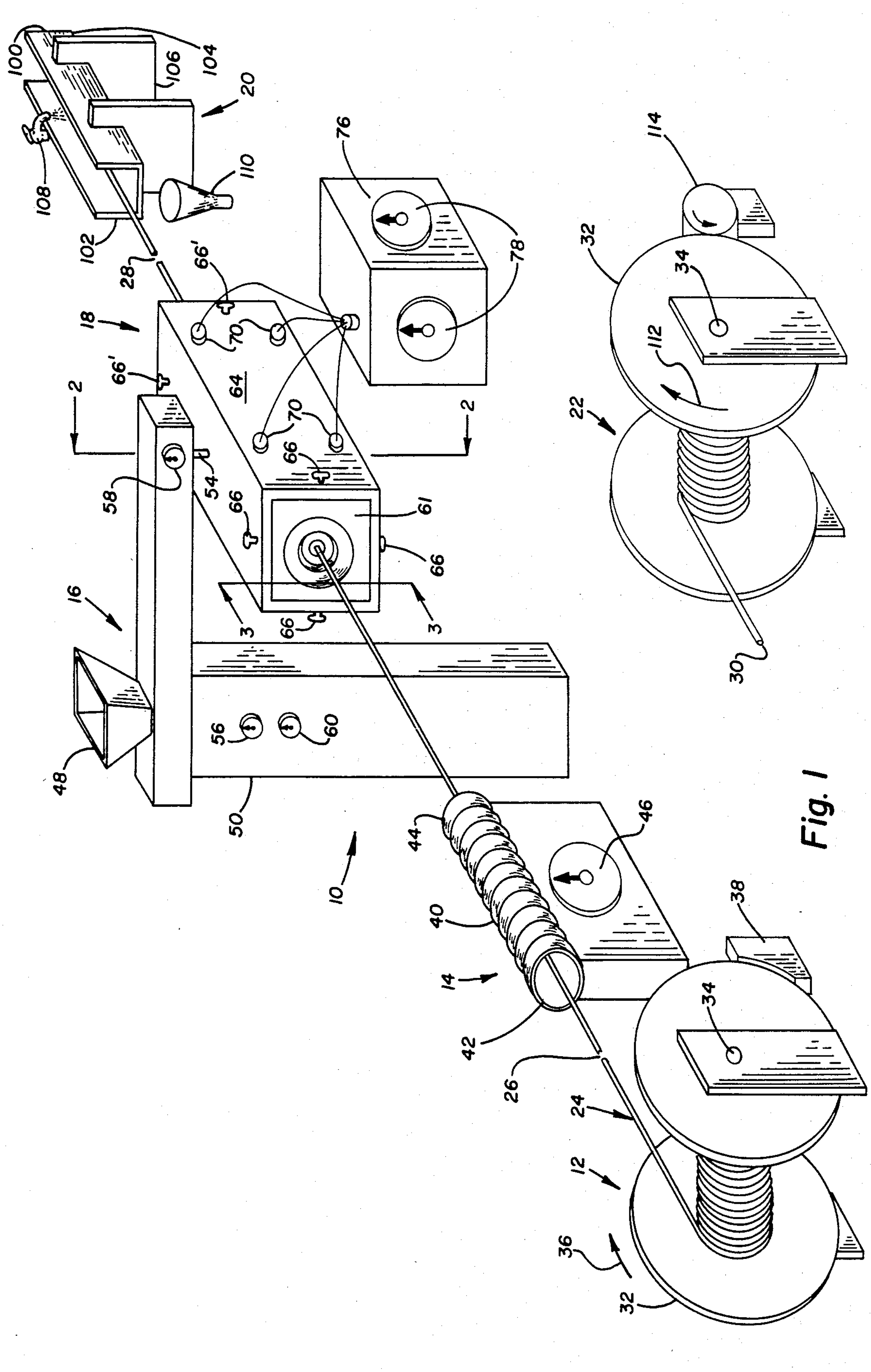
FIG. 1 is a perspective, fragmentary and diagramatic view of the apparatus of the invention.

Referring to the drawings, and specifically FIG. 1, the apparatus of the invention will be described. The apparatus 10 generally consists of a filament pay-out device 12, a filament heater 14, a coating material dispenser 16, a coating die 18, a hardener 20, and a filament take-up device 22. As shown in FIG. 1, the filament 24 is broken at 26, at 28, and at 30. At the filament break 26, when the apparatus of the invention is used to manufacture magnet wire, conventional wire drawing apparatus may be inserted. Thus, an oversized filament 24 may be reduced to the desired size by the drawing equipment prior to coating the filament. The filament heater 14 in a specific embodiment in which magnet wire is being manufactured by the apparatus of the invention may include an annealer whereby the effects of drawing the wire or stretching the wire may be eliminated. In other specific embodiments in which magnet wire is being manufactured by the apparatus of the invention, additional coating dies 18 and hardeners 20 may be inserted at 28 such that successive coats of different coating materials may be applied to the filament in a continuous manner.

The term "filament" is used herein for all strand materials. Filaments thus include both copper and aluminum conductors and insulated copper and aluminum conductors which prior to the application of a coat of material by the apparatus and method of the invention have been insulated with a base coat of insulating material, a tape of insulating material either spirally or longitudinally wrapped on the conductor, or other conventional insulating materials, and other strand materials desirably coated. While the specific embodiments herein described primarily relate to the manufacture of magnet wire, the apparatus of the invention is thought to have utility in coating all sorts of filaments other than conductors or insulated conductors in the production of magnet wire.

The term "flowable material" is used herein for the general class of coating materials applied by the method and apparatus of the invention. Again, while the specific embodiments herein described refer to meltable coating materials which can be hardened by cooling the material to ambient temperatures, other coating materials which are flowable at elevated temperatures and pressures are contemplated as being within the general class of materials which can be applied by the method and apparatus of the invention. These materials include materials which are initially flowable but later hardened by curing or thermosetting the material and also coating materials which may include up to about 5% by weight of solvent to render them flowable and later hardenable by driving the solvent from the material. In the manufacture of magnet wire, several different materials can be applied by the method and apparatus of the invention. These include but are not limited to polyamides such as Nylon, polyethylene terephthalates, polybutylene terephthalates, polyethylenes, polyphenylene sulfide, polycarbonates, polypropylenes, polyethersulfone, polyether imides, polyether etherketone, polysulphones, epoxys, flurocarbons including ethylene-chlorotrifluoroethylene and hylene tetrafluoroethylene polyvinyl formal, phenoxys, polyvinyl butyrol, polyamide-imide, polyesters and combinations thereof.

The filament pay-out device 12 includes a spool 32 on which the filament 24 desirably coated is stored. The spool 32 is mounted on spindle 34 of the pay-out device 12 so as to freely rotate in the direction of the arrow 36. Operatively associated with the spool 32 is a brake 38 which restrains the rotation of the spool 32 as the filament 24 is being pulled therefrom by the take-up device 22 so as to prevent entanglements. In accordance with the method of the invention, it is highly possible that in a magnet wire manufacturing plant where conductors are being rolled, drawn or otherwise reduced in size to desirable conductor from ingots, the pay-out device 12 can be completely eliminated, since the remaining apparatus can be used to coat conductors continuously in a single pass as the conductor is supplied from such rolling and drawing apparatus. The reels 32 in this instance can be the reels upon which bare copper and aluminum conductors are now transported from the rolling and drawing operations to the magnet wire manufacturing plants. In all instances where the take-up device 12 is eliminated and rolling and drawing operations are substituted therefore, an annealer is an essential part of the apparatus in order to eliminate the effects of working the conductor during the rolling and drawing operations.

Filament heater 14 is an essential part of the apparatus of the invention to be used in the performance of the method of the invention. A filament heater may be used solely to raise the temperature of the filament prior to the application of the coating material or may be an annealer if hard bare wire is used or to further reduce the effects of the aforementioned rolling and drawing process, if required. Thus, in a specific embodiment, the filament heater 14 may consist of an annealer, or may consist of a filament heater. In the specific filament heater embodiment 14 illustrated in FIG. 1, the filament heater comprises a resistance coil 40 being generally tubular in shape and having opposite open ends 42 and 44. The filament or conductor 24 is trained between the pay-out device 12 and the take-up device 22 through the coil 40. The filament heater 14 is also provided with a control 46 by which the temperature of the conductor 25 can be controlled. The filament heater 14 may also include a filament temperature measuring device such as a radiation pyrometer. Hereinafter in specific examples, the approximate wire temperatures reported herein are measured by such a device.

The coating die 18 is illustrated in FIGS. 1 through 4. The coating die 18 includes an entrance die 61, an exit die 62 and a die block 64. Entrance die 61 is mounted in the forward portion of die block 64 by screws 66. Exit die 62 is mounted in the rearward portion of die block 64 by screws 66'. Separating entrance die 61 and exit die 62 is an interior passage 65. Die block 64 is provided with heater bores 68 in which heaters 70 are positioned. In a specific embodiment, each heater 70 may be a tubular calrod heater. Additionally, the die block 64 is provided with a thermocouple bore 72 therein in which a thermocouple 74 (shown only in FIG. 4) may be positioned. Furthermore, die block 64 is provided with a nozzle bore 75 therein to which the nozzle 54 of material applicator 16 is connected. Hereinafter, die temperatures are reported with regard to specific examples; these die temperatures are measured by thermocouple 74. Heaters 70 are connected by suitable conductors to a heater 76. Heater 76 is provided with paired controls 78 whereby the temperature of the entrance die 61 and the exit die 62 each can be elevated above ambient temperature (for each die) and controlled, respectively, as desired.

Figure 2:
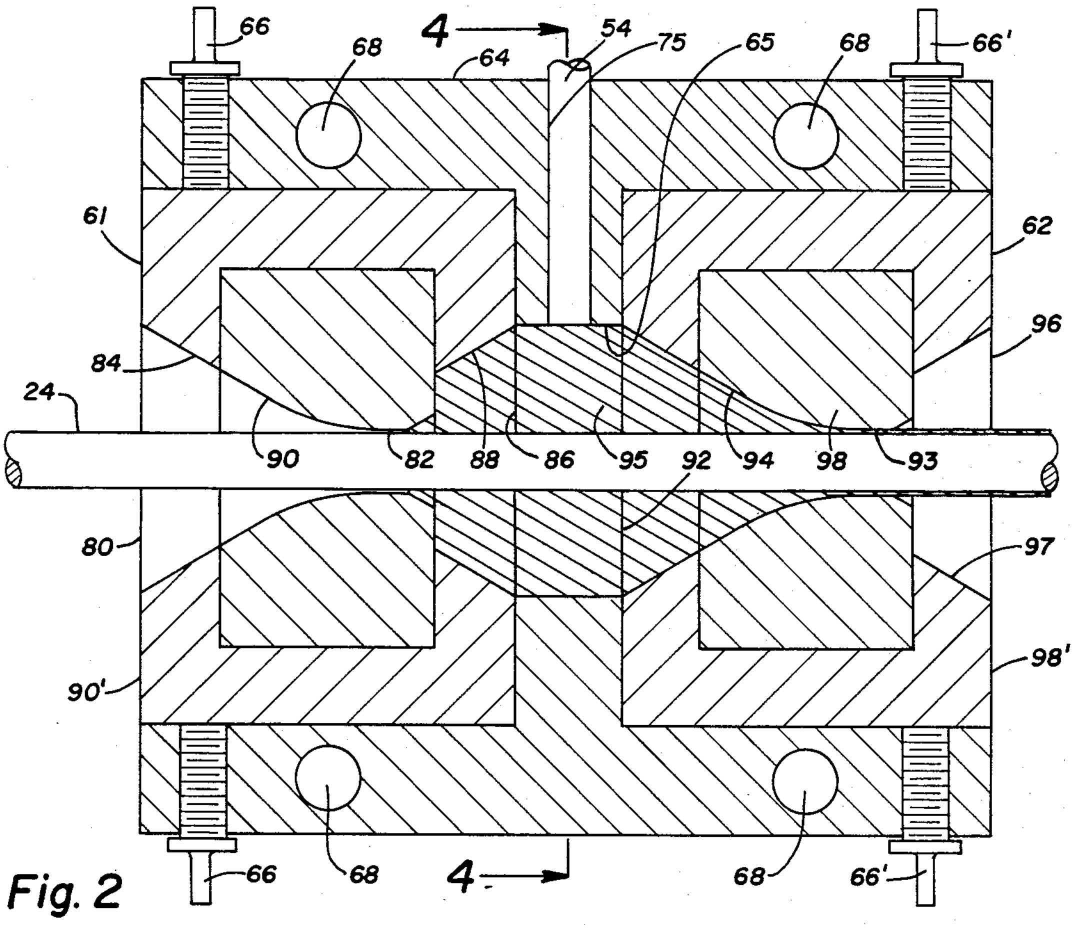
FIG. 2 is a cross-sectional view of the coating die of the invention, taken substantially along the Section Line 2—2 of FIG. 1.
Figure 3:
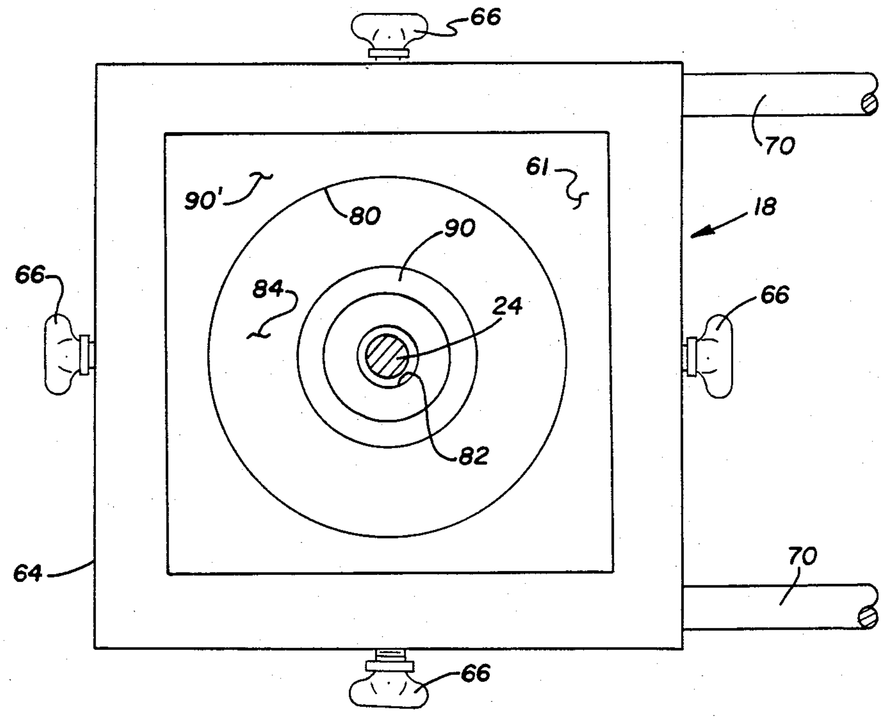
FIG. 3 is a front plan view of the coating die of the invention taken substantially along the Section Line 3—3 of FIG. 1.
Figure 4:
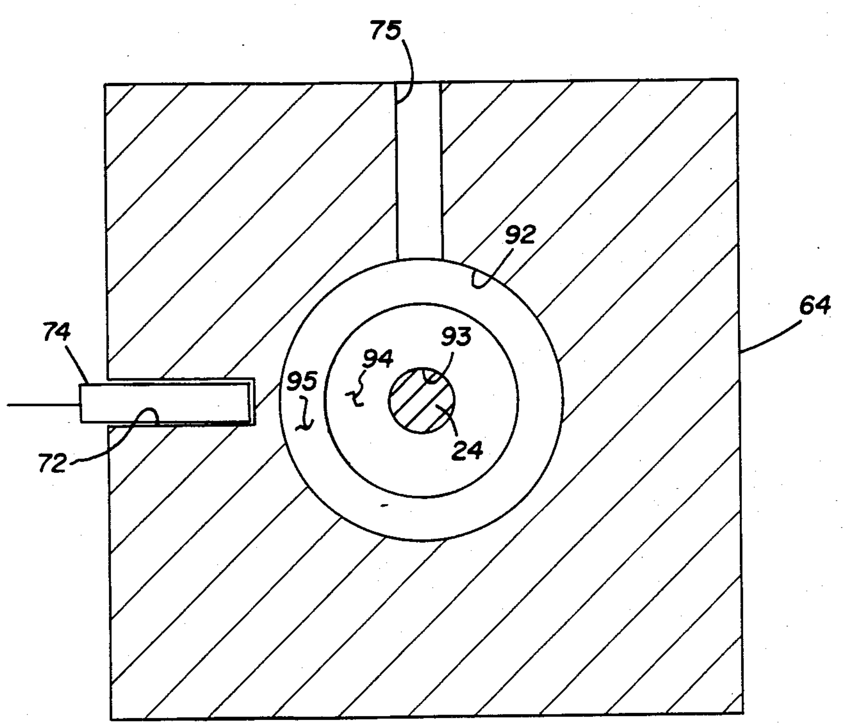
FIG. 4 is a cross-sectional view of the coating die of the invention taken substantially along the Section Line 4—4 of FIG. 2.

Referring to FIG. 2, the entrance die 61 is shown in cross-section to include an entrance opening 80, a throat 82 and a converging interior wall 84 which interconnects the throat 82 and the entrance opening 80 of the entrance die 61. Entrance die 61 also has an exit opening 86 and a diverging interior wall 88 interconnecting the throat 82 and the exit opening 86. In a specific embodiment, the entrance die 61 can be constructed as illustrated in a two-piece fashion having a central piece 90 including a throat portion of harder and more wear-resistant material, and exterior piece 90' which includes both the entrance opening 80 and the exit opening 86.

The exit die 62 is also shown in cross-section to include an entrance opening 92, a throat 93 and a converging interior wall 94 which interconnects the throat 93 and the entrance opening 92 of the exit die 62. Converging interior wall 94 partially defines a die chamber 95 as will be mentioned hereinafter. Exit die 62 also has an exit opening 96 and a diverging interior wall 97 that interconnects the throat 93 and the exit opening 96. In a specific embodiment, the exit die 62 can be constructed as illustrated in a two-piece fashion having a central piece 98 including a throat portion of harder and more wear resistant material than the exterior piece 98' which includes both the entrance opening 92 and exit opening 96.

In a specific embodiment, the converging wall 84 and 94 defines an angle A with conductor 24 of about 5 to about 40 degrees and throats 82 and 93 are tapered from converging walls 84 and 94 to diverging wall 88 and 97 so as to define an angle with the conductor 24 of about 1 to about 2 degrees.

The flowable material applicator 16 has a chute 48 by which the material is supplied to the applicator, a material reservoir 50 in which the material may be stored, and a positive displacement pump 52 which pressurizes reservoir 50 and dispenses the flowable material through a nozzle 54. When using melts or other temperature responsive flowable materials, reservoir 50 is provided with a heater and a control device 56 by which the temperature of the material in the reservoir can be controlled. An additional control device 58 is associated with the positive displacement pump 52 to control the amount of flowable material passing through nozzle 54. In a specific embodiment, the fluid material applicator 16 may be an extrusion apparatus having the features above described. In those applications in which the flowable material is rendered more flowable by the use of a small portion of solvent, both the coating material and the solvent may be fed into the applicator via the chute 48 and the reservoir 50 may be provided with a mixing apparatus having associated therewith a separate control 60.

The central die chamber 95 is completely defined by the diverging wall 88 of entrance die 61, the converging interior wall 94 of exit die 62, and the walls of interior passage 65 of die block 64. Die chamber 95 is positioned between throat 82 and throat 92. The nozzle 54 is connected to nozzle bore 75 so that coating material in reservoir 50 may be injected into the central die chamber 99 under pressure by material applicator 16. The filament or conductor 24 is trained between the pay-out device 12 and the take-up device 22 through the entrance die 61, the central die chamber 95, and the exit die 62.

The hardener 20 functions to harden the coat of material on the filament or conductor 24 prior to spooling the coated filament or magnet wire by the take-up device 22. The hardener 20 as illustrated includes a trough 100 having opposite open ends 102 and 104. The trough is positioned such that the filament or conductor 24 can be trained to enter the open end 102, pass through the trough 100, and exit the open end 104. Also as shown, the trough 100 is sloped downwardly toward the open end 102 and provided with a source of cooling fluid, such as water 108, adjacent open end 104 and a drain 110 adjacent open end 102. In many specific embodiments, a water quench utilizing the structure of the hardener 20 is desired. In other specific embodiments, a quench is not required and thus, the cooling fluid is not used. In these embodiments, either a flow of ambient air or refrigerated air (where available) is trained on the coated conductor or filament 24.

In specific embodiments in which multiple coats of different materials are being applied to the filament or conductor 24 by successive spaced apart coating dies 18 or such as disclosed in U.S. patent application Ser. No. 931,314 abandoned and its continuation-in-part applications assigned to the same assignee, the disclosure of which are incorporated herein by reference, the particular coating die used depends on the material to be applied. Each of the coating dies will have a material applicator 16 associated therewith and may have a hardener 20 associated therewith. The term "coating station" is used herein to refer to the assemblage of a material applicator 16, a coating die, and a hardener 20. In these embodiments, there will be a plurality of spaced apart coating stations between the pay-out device 12 and the take-up device 22.

The take-up device 22 in many respects is similar to the pay-out device 12. The take-up device 22 comprises a reel 32 on which the coated filament or conductor 24 is spooled for shipment. Thus, reels 32 may be the conventional spools on which coated filaments are conventionally shipped. Spools 32 are mounted for rotation on a spindle 34 so as to be driven in the direction of the arrow 112. Operatively connected to the spool 32 is a spool driver 114 which drives the spool 32 and thereby pulls the filament or conductor 24 from the spool or reel 32 of the pay-out device 12.

The Method

The method of the invention will now be described. Reference to FIGS. 1 through 4 will be referred to and the terms "flowable material" and "filament" will be used as above defined. This description of the method of the invention will also specifically refer to the manufacture of magnet wire in a single pass whereby the filament or conductor is drawn or otherwise formed, coated and spooled in a continuous operation.

A continuous supply of the filament or conductor 24 is provided either by the pay-out device 12 as illustrated in FIG. 1 or from a rolling and drawing operation. If supplied from a rolling and drawing operation, the conductor 24 is always annealed to remove all effects of the rolling and drawing operation.

The filament or conductor 24 is then heated, if desired. Whether or not the filament 24 is heated is dependant upon the coating material utilized and the wire properties desired. Thus, the filament 24 may be heated by the heating device 14 to a temperature from about ambient temperature to about the decomposition temperature of the coating material. In most applications utilizing a melt or a heat-responsive flowable material in which the coat of material is desirably adhered to the filament or conductor 24, the filament or conductor is heated to a temperature from just below to about the melting point of the coating material. In most applications utilizing a melt or a heat-responsive flowable material in which the adhesion of the coat of material to the filament or conductor 24 is not required, the filament or conductor 24 is maintained from about the ambient temperature to slightly above the ambient temperature.

The central die chamber 99 is then filled with a flowable material. The flowable material is stored in the material reservoir 50 at a flowable temperature and pressure and is injected into the central die chamber 99 by applicator 16. Once the central die chamber 99 has been filled with material, the flowable material contained therein will assume the pressure of the flowable coating material in the reservoir 50. Pump 52 must have an adequate capacity to maintain pressures up to about 2000 pis in reservoir 50 and chamber 99. By control 58, the responsiveness to pressure changes desired can be controlled. By controls 56 and 78, the temperature of the material in the reservoir 50 and chamber 99 can be controlled. The pressurized temperature of the flowable material in the central die chamber 99 must be carefully controlled for several reasons. First, if the pressure and/or temperature of the flowable material in the central die chamber 99 is too great, the flowable coating material may have the tendency to leak in significant quantities from the central die chamber 99 through throat 82, although the filament passing through throat 82 will allow operating pressures higher than that at which the flowable material will leak from opening 80 when the filament is stationary in opening 80. Any significant leakage of flowable coating material from the die block 64 is not preferred. Secondly, both the pressure and temperature of the flowable material relate to the viscosity and/or flow characteristics of the flowable material, and must be such that the viscosity and/or flow characteristics of the flowable material performs its centering function relative to the exit die 62 and produces a concentric coating as will be subsequently discussed, wets the filament to be coated, and suitably adheres to the filament. Thirdly, if the pressure and the temperature of the flowable material is too low, excessive filament stretching may occur from die 18 excessively resisting the movement of filament therethrough. It is for these reasons, that the applicator 16 is provided with controls 56, 58, and 60.

The coating material is then applied to the filament or conductor 24 by passing the same through die 18. The coating material within the die chamber functions to center the filament or conductor 24 within the throat portions 82 and 93 of dies 61 and 62. In all instances known to the applicants wherein the central die chamber 99 is properly filled with coating material 115 and the temperature and pressure therein are properly controlled, filaments or conductors 24 that are coated by the method and apparatus of the invention have a surprisingly concentric and continuous coat of coating material thereon. Conversely, in all situations in which the central die chamber 99 is not properly filled, and/or the temperature and pressure therein is not properly controlled, a non-concentric and discontinuous coat of coating material is applied to the filament or conductor 24. Thus, the proper filling of the central die chamber 99 with coating material, the control of the temperature and pressure of the coating material therein are essential to the method of the invention. Coating materials of various types have been successfully applied in accordance with the method of the invention by the above-described apparatus at viscosities from about 5,000 cps to 200,000 cps.

Applicant does not completely understand the actions of the flowable material within the central die chamber 99 which results in filaments having coatings of perfect concentricity and continuity thereon. The coating material contained within the central die chamber 99 is believed to have movement adjacent the throat 83 of the exit die 62. This movement may be somewhat similar to the movement of the annular or toroidal support 120 as described in U.S. patent application Ser. No. 931,314, abandoned filed Aug. 7, 1978 and its continuation-in-part applications.

The throat portion 82 of the entrance die 61 prevents the flowable material within the die chamber 99 from leaking from die 18 through die 61. Depending upon the flow properties of the coating material, throat portion 82 will have a diameter of about 3 mil to about 15 mil larger than the diameter of filament 24.

The throat portion 93 of the exit die 62 regulates the thickness of the coat of coating material left on the filament or conductor 24 exiting the coating die 18.

The size of the throat portion 93 of the exit die 62 varies in accordance with the size of the filament or conductor 24, and the desired thickness of the coat of coating material to be applied thereon. The method of the invention has been successfully used with filaments ranging from about 30 AW gauge to about $\frac{3}{8}''$ rod. Conductors of rectangular cross-sections and of other cross-sections can also be coated by the method and apparatus of the invention so that as long as the throat portions 82 and 93 of the entrance die 61 and exit die 62, respectively, can be provided in a geometrically similar shape. Coatings from about $\frac{1}{2}$ mil to about 16 mils thick can be applied by the method of the invention. Depending upon the flow properties of the coating material, the throat portion 93 of the exit die 62 will have a diameter in most cases from about the desired diameter to about 2 mils larger than the desired diameter of the coated filament or conductor 24 of magnet wire.

The coated filament or conductor 24 is then passed through the hardener 20 in order to harden the coating material thereon. While the structure of the hardener 20 and the function thereof has been described hereinabove, it should be emphasized here that the operation of the hardener 20 depends greatly upon the coating material used. Either a water quench or an air quench may be utilized. Additionally, in those flowable materials in which small amounts of solvent are used to aid in the properties of the flowable material, the hardener 20 may take the form of a filament heater 14, or a conventional curing oven (not shown). In all cases, the type of hardener 20 utilized and the temperature of the cooling liquid, air or other fluid utilized will depend both on the coating material and the speed at which the coated filament passes through the hardener 20.

The operation and function of the take-up device 22 was described hereinabove. However, the speed at which the take-up device 22 was driven was not mentioned. The driver 114 is not limited in any way by the method of the invention. The speed at which the driver 114 drives the spool 32 of the take-up device 22, in the embodiment illustrated in FIG. 1 utilizing both pay-out 12 and take-up 22 devices, is solely limited by the payout 12 and take-up 22 devices themselves when applying any of the coating materials mentioned herein. When the pay-out device 12 is eliminated and conventional rolling and drawing operations are substituted therefore, the speed at which the take-up device 22 is driven by the driver 114 is solely limited by the take-up device 22, itself.

Specific examples in which conductors of various sizes have been coated with coating material such as above mentioned in accordance with the method of this invention are tabulated in Table 1. Table 1 solely relates to the production of magnet wire. Table 1 tabulates all of the essential properties of the coating material and the conductor, all of the essential process conditions, and all of the essential physical and electrical properties of the magnet wire produced in this specific example in accordance with the method of the invention utilizing the apparatus described hereinabove.

The magnet wire produced by the apparatus of the invention in accordance with the method of the invention meets all of the requirements of magnet wire made by other existing commercial processes. Table 1 tabulates the physical and electrical properties of various magnet wires manufactured in accordance with the method of the invention utilizing the apparatus of the invention. A surprising characteristic of all magnet wires made in accordance with the method of the invention utilizing the apparatus of the invention is the concentricity of the coating applied to the conductor and the continuity thereof. Both the concentricity and continuity are a surprising result when compared to magnet wires made by other existing commercial processes, without regard to the means by which the conductor or filament 24 is centered within the coating die 18. Magnet wire produced by other commercial processes, such as the application of coatings from solution, periodically result in non-concentric coatings and non-continuous coatings. In fact, the continuity of coatings applied from solution is such that reliance upon a single coating of magnet wire insulation is unheard of; and for this reason and others, multiple coatings are used as above-mentioned. Magnet wire having a single coat is a commercial reality due to the concentricity and thickness of the coatings that can be applied by the apparatus and method of the invention.

The invention provides an improved method and apparatus for applying coatings of a flowable material concentrically to a moving elongated filament. In the manufacture of magnet wire, the method and apparatus of the invention is an improvement over conventional methods of manufacturing magnet wire. By the invention, insulation can be applied to a continuously moving elongated conductor, concentrically, to a desired thickness in a single pass. Materials can be applied by the invention which can not be applied by the method and apparatus disclosed in U.S. application Ser. No. 931,314 now abandoned. The speed is limited only by the pay-off and take-up devices. The conductor can be drawn or otherwise formed, coated, and spooled in a continuous operation which completely eliminates or substantially reduces the use of solvents, thereby eliminating the cost of solvents and the need for pollution control equipment. The apparatus of the invention completely eliminates the need for highly complex machinery or dies which experience high wear and must be replaced periodically. The improved method and apparatus of the invention has all of the advantages of a conventional extrusion process but none of the disadvantages.

While there have been described above the principles of this invention in connected with specific apparatus, it is to be clearly understood that this description is made only by way of example and not as a limitation to the scope of the invention.

TABLE 1

| | | | | | 2 Coat Tandem | | 2 Coat Tandem | |
|---|---|---|---|---|---|---|---|---|
| | Ex. 1 | Ex. 2 | Ex. 3 | Ex. 4 | Ex. 5 | Ex. 6 | Ex. 7 | Ex. 8 |
| Flowable Material | Nylon | Nylon | Nylon | Nylon | Dacron | Dacron | Dacron | Dacron |
| Wire Size | 18 Alum* | 18 Alum* | 18 Alum* | 18 Alum* | 18 Copper | | Drawn Fm12 18 Alum | |
| Base Coat | Polyester | Polyester | Polyester | Amide-imide | Dacron | | Dacron | |
| Base Coat PRM# | | | | | | | | |
| Die Size - Entry/Exit Inches | 054/0435 | 054/0435 | 054/0435 | 054/0435 | BSCT 055/0425 | TOP 0454/0442 | BSCT S. Die 0425 | TOP 054/0442 |
| Die Press - psi | 700–750 | 650–750 | 900–1050 | 400–500 | 450–500 | 900–1000 | | 300–375 |
| Approx. Melt Temp °C. | 293 | 293 | 307 | 293 | 282 | 282 | 282 | 282 |
| Approx. Melt Temp °F. | | | | | | | | |
| Die Temp. °C. | 300 | 300 | 315 | 300 | 290 | 290 | 290 | 290 |
| Temp Die °F. | | | | | | | | |
| Anneal Volts | 0 | 0 | 0 | 0 | 9 | | 5–9 | |
| Wire Heat Control Wheel | 0 | 0 | 0 | 0 | 210 | | 240–270 | |
| Wire Heat Control Wheel °C. | | | | | | | | |
| Speed FPM | 100 | 100 | 100 | 100 | 250–300 | | 140–210 | |
| Physical Properties (Ansi-Nema Std. Publ. MW1000-1977) | | | | | | | | |
| Build Inches | 0035 | 0035 | 0031–0033 | 0031–0033 | 0031–0033 | | 0030–0033 | |
| Smoothness Base Coat | Good | Good | Good | Good | Good | | Good | |
| Elongation % | 35 | 23–25 | 30–31 | 26–30 | 32–33 | | 17–25 | |
| Flexibility BP-1X | OK | OK | OK | OK | OK | | OK | |
| Snap | OK | OK | OK | OK | OK | | OK | |
| Slit Twist | 72 | 113 | 85 | 73 | 263 | | 203–260 | |
| Preheat Tube Oven Length In | 72 | 72 | 72 | 72 | — | | — | |
| Tube Oven Temp - °C. | 450 | 450 | 500 | 500 | — | | — | |
| Approx. Wire Temp °F. | N/A | N/A | N/A | N/A | 575–625 | | N/A | |
| Electrical Properties (Ansi-Nema Std. Publ. MW1000-1977) | | | | | | | | |
| Dielectric Breakdown | 7300/9000 | 8200/8600 | 8000/9500 | 7900/9000 | 8800/10600 | | 8000/11400 | |
| Continuity @ V-DC (Faults/100 Ft) | 2 (3000 V) | 3 (3000 V) | 4 (3000 V) | 3 (3000 V) | 2–7 (3000 V) | | 1–7 (3000 V) | |

| | 2 Coat Tandem | | 2 Coat Tandem | | | | | |
|---|---|---|---|---|---|---|---|---|
| | Ex. 9 | Ex. 10 | Ex. 11 | Ex. 12 | Ex. 13 | Ex. 14 | Ex. 15 | Ex. 16 |
| Flowable Material | Polyethylene | Nylon | Polyethylene | Nylon | Tefzel 280 | Polyethylene | Polyethylene | Polyethylene |
| Wire Size | 11 Copper** | | 12 Copper** | | 7 Copper | 21 Copper**** | 21 Copper**** | 23 Copper**** |
| Base Coat | Polyvinyl Formal | | Polyvinyl Formal | | Polyimide | | | |
| Base Coat PRM# | | | | | | 114 | 151 | 151 |
| Die Size - Entry/Exit Inches | BSCT 100/108 | TOP 117/115 | BSCT 087/105 | TOP 111/109 | 154/155–159 | 0480/0375 | 0480/0375 | 0375/0275 |
| Die Press - psi | 300–500 | 200 | 300–450 | 252 | 600–1000 | Unknown | — | — |
| Approx. Melt Temp °C. | — | — | — | — | — | | | |
| Approx. Melt Temp °F. | | | | | | 600 | 500–600 | 500–525 |
| Die Temp. °C. | 300 | 290 | 300–315 | 290 | 315 | | | |
| Temp Die °F. | | | | | | 500 | 500–600 | 500–525 |
| Anneal Volts | 0 | | 0 | | 0 | 0 | 0–25 | 4.6–6.5 |
| Wire Heat Control Wheel | 0 | | 0 | | 0 | | | |
| Wire Heat Control Wheel °C. | | | | | | Ambient | Ambient-230 | 200 |
| Speed FPM | 50–200 | | 100–150 | | 52–100 | 100–300 | 100–300 | 250–500 |
| Physical Properties (Ansi-Nema Std. Publ. MW1000-1977) | | | | | | | | |
| Build Inches | Total 0025–0237 | | Total 0256–0261 | | total 0105–0137 | 0072–0076 | 0072–0127 | 0045–0046 |

TABLE 1-continued

| | | | | | | | | |
|---|---|---|---|---|---|---|---|---|
| Smoothness Base Coat | Good | | Good | | Good | Good | Good | Good |
| Elongation % | — | — | — | — | — | 10-13 | 10-14 | 12-16 |
| Flexibility BP-1X | OK | | OK | | OK | OK | OK | OK |
| Snap | — | — | — | — | — | Lost Adhes | Lost Adhes | Lost Adhes |
| Slit Twist | — | — | — | — | — | 0 | 0 | 0 |
| Preheat Tube Oven Length In | — | — | — | — | — | — | 300-400 | 250-400 |
| Tube Oven Temp - °C. | — | — | — | — | — | | | |
| Approx. Wire Temp °F. | N/A | — | N/A | — | N/A | | | |
| Electrical Properties (Ansi-Nema Std. Publ. MW1000-1977) | | | | | | | | |
| Dielectric Breakdown | 16600/20000 | | 20000+ | | 10200/15400 | 13000/19000 | 9500/20000 | 8400/13600 |
| Continuity @ V-DC (Faults/100 Ft) | — | | — | | — | 0-5<br>3000 V | 0-5<br>3000 V | 1<br>3000 V |

| | Ex. 17 | Ex. 18 | Ex. 19 | Ex. 20 | Ex. 21 | Ex. 22 | Ex. 23 | Ex. 24 |
|---|---|---|---|---|---|---|---|---|
| Flowable Material | Polyethylene | Polyethylene | Polyethylene | Polyethylene | Polyethylene | Polyethylene | Polyethylene | Polypropylene |
| Wire Size | 23 Copper**** | 23 Copper**** | 23 Copper**** | 23 Copper**** | 23 Copper**** | 23 Copper**** | 22 Copper | 22 Copper |
| Base Coat PRM# | 218 | 218 | 219 | 219 | 219 | 218 | 287 | 287 |
| Die Size - Entry/Exit Inches | 0300/0275 | 0350/0325 | 0350/0325 | 0300/0275 | 0300/0445 | 0300/0445 | 0300/0270 | 0300/0270 |
| Die Press - psi | — | — | — | — | — | — | — | — |
| Approx. Melt Temp °F. | 525 | 525 | 525 | 525 | 525 | 525 | 625 | 550 |
| Temp Die °F. | 525 | 525 | 525 | 525 | 525 | 525 | 625 | 550 |
| Anneal Volts | 5.5 | 5.0 | 5.0 | 5.5 | 4.0 | 4.0 | 6.0-8.5 | 8.5 |
| Wire Heat Control Wheel °C. | 200 | 200 | 200 | 200 | 200 | 200 | 170-215 | 170 |
| Speed FPM | 500 | 400 | 400 | 500 | 300 | 300 | 100-300 | 300 |
| Physical Properties (Ansi-Nema Std. Publ. MW1000-1977) | | | | | | | | |
| Build Inches | 0064-0066 | 0093-0100 | 0099-0101 | 0065-0067 | 0245-0250 | 0244-0260 | 0015-0278 | 0011-0023 |
| Smoothness Base Coat | Good | Good | Good | Good | Good | Good | Good | Sl Orange Pl |
| Elongation % | 16-17 | 15-19 | 15-18 | 17-20 | 12-19 | 12-14 | 21-26 | 24-27 |
| Flexibility BP-1X | OK | OK | OK | OK | OK | OK | OK | OK |
| Snap | Lost Adhes | Lost Adhes | Lost Adhes | Lost Adhes | Lost Adhes | Lost Adhes | OK | OK |
| Slit Twist | 0 | 0 | 0 | 0 | 0 | 0 | 0-250 | 0 |
| Approx. Wire temp °F. | 200-300 | 200-300 | 200-300 | 200-300 | 225-325 | 225-325 | 350-500 | 525-625 |
| Electrical Properties (Ansi-Nema Std. Publ. MW1000-1977) | | | | | | | | |
| Dielectric Breakdown | 7400/11000 | 14000/16200 | 12800/15300 | 11200/13800 | 18250/19600 | 18700/20000+ | 1400/8900 | 1900/5600 |
| Continuity @ V-DC (Faults/100 Ft) | 2<br>3000 V | 0-1<br>3000 V | 1<br>3000 V | 1<br>3000 V | 1<br>3000 V | 1<br>3000 V | 1-19<br>(500 V) | 1-100<br>(500 V) |

| | Ex. 25 | Ex. 26 | Ex. 27 | Ex. 28 | Ex. 29 | Ex. 30 | Ex. 31 | Ex. 32 |
|---|---|---|---|---|---|---|---|---|
| Flowable Material | Polyallomer | Dacron/Zytel 151 | Dacron/Zytel 151 | Dacron/Zytel 151 | Dacron/Zytel 151 | Dacton/Epoxy | Nylon | Nylon |
| Wire Size | 22 Copper | 18 Copper | 18 Copper | 18 Copper | 18 Copper | 18 Copper | 20 Copper | 25 Copper |
| Base Coat PRM# | 291 | 309 | 341 | 342 | 346 | 350 | | |
| Die Size - Entry/Exit Inches | 0375/0350 | 0480/0435 | 0540/0435 | 0540/0435 | 0540/0435 | 0540/0435 | 375/340 | 0300-0250/0207 |
| Die Press - psi | — | — | 1500/1600 | 1300/1400 | 1550/1650 | 1900/2000 | 550-800 | 600-800 |
| Approx. Melt Temp °F. | 475 | 495 | 560 | 560 | 560 | 560 | 555 | 555 |
| Oven Temp Die °F. | | | | | | | 518 | 518 |
| Temp Die °F. | 550 | 500 | 555 | 555 | 555 | 555 | | |
| Anneal Volts | 8.5 | 5.5 | 9.0 | 9.0 | 9.0 | 9.0 | 17.0 | 17.0-18.0 |
| Wire Heat Control Wheel °C. | 200 | 260 | 290 | 210 | 210 | 210 | 230 | 230 |
| Speed FPM | 300 | 100 | 300 | 300 | 300 | 300 | 400 | 400 |
| Physical Properties | | | | | | | | |

TABLE 1-continued

| | | | | | | | | |
|---|---|---|---|---|---|---|---|---|
| (Ansi-Nema Std. Publ. MW1000-1977) | | | | | | | | |
| Build Inches | 0101-0102 | 0052/0055 | 0031/0032 | 0030/0031 | 0031/0032 | 0032 | 0017-0018 | 0021-0024 |
| Smoothness Base Coat | Sl Orange Pl | Good | Good | Good | Good | Good | Good | Good |
| Elongation % | 24-25 | 29-30 | 28-30 | 28-31 | 27-31 | 30-31 | 28-33 | 25-29 |
| Flexibility BP-1X | OK | OK | OK | OK | OK | OK | | |
| Flexibility 1X BP-1X | | | | | | | OK | OK |
| Snap | OK | OK | OK | OK | OK | OK | OK | OK |
| Slit Twist | 0 | 201+ | 237 | 250 | 259 | 192 | 216-265 | 240-325+ |
| Approx. Wire Temp °F. | 525-625 | 300-350 | 575-625 | 575-625 | 575-625 | 575-625 | 375-425 | 375-425 |
| Electrical Properties | | | | | | | | |
| (Ansi-Nema Std. Publ. MW1000-1977) | | | | | | | | |
| Dielectric Breakdown | 17000/19000 | 11250/14000 | 7200/9200 | 7200/9200 | 7200/9200 | 8975/11150 | 3460/4900 | 3830/5600 |
| Continuity @ V-DC (Faults/100 Ft) | 1 | 3 | 18 | 5 | 11 | 2 | 1-9 | 0-12 |
| | 3000 V | 3000 V | 3000 V | 3000 V | 3000 V | 3000 V | (1500 V) | (2000 V) |

| | Ex. 33 | Ex. 34 | Ex. 35 | Ex. 36 | Ex. 37 | Ex. 38 | Ex. 39 | Ex. 40 |
|---|---|---|---|---|---|---|---|---|
| Flowable Material | Nylon | Nylon | Nylon | Nylon | Nylon | Nylon | Nylon | Nylon |
| Wire Size | 19 Copper | 24 Copper | 24 Copper | 23 Copper | 21 Copper | 20 Copper | 19 Copper | 19 Copper |
| Die Size - Entry/Exit Inches | 0434-049 | 026/0220 | 026/0222 | 030/0248 | 0338/0310 | 0375/034 | 0434/0398 | 0434/0398 |
| | 0396-0403 | | | | | | | |
| Die Press psi | 800-1100 | 600-800 | 900-1500 | 1350-2000 | 1300-1550 | 1000-1200 | 1400-1600 | 1400-1600 |
| Approx. Melt Temp °F. | 550-560 | 555 | 525 | 525 | 525 | 540 | 535 | 540 |
| Oven Temp Die °F. | 509-518 | 518 | 491 | 491 | 491 | 500 | 509 | 509 |
| Anneal Volts | 18 | 18 | 22.5 | 20.9-21.8 | 21.3-21.7 | 19.0 | 23.0 | 23.0 |
| Wire Heat Control Wheel °C. | 230-235 | 230 | 230 | 230 | 230 | 200 | 215 | 215 |
| Speed FPM | 400 | 400 | 600 | 600 | 600 | 600 | 600 | 600 |
| Physical Properties | | | | | | | | |
| (Ansi-Nema Std. Publ. MW1000-1977) | | | | | | | | |
| Build Inches | 0020-0033 | 0011-0012 | 0015-0016 | 0015-0016 | 0018-0020 | 0018 | 0030 | 0031-0032 |
| Smoothness Base Coat | Good | Good | Good | Good | Good | Good | Good | Good |
| Elongation % | 26.5-30.5 | 26-30 | 28-31 | 26-30 | 27.5-30 | 30-32 | 28-29 | 26-27.5 |
| Flexibility 1X BP-1X | OK | OK | OK | OK | OK | OK | OK | OK |
| Snap | OK | OK | OK | OK | OK | OK | OK | OK |
| Slit Twist | 193-225 | 275-350 | 320-390 | 250-330 | 285-290 | 258 | 249+ | 230 |
| Approx. Wire Temp °F. | 375-425 | 375-425 | 500-550 | 475-525 | 475-525 | 450-500 | 500-550 | 500-550 |
| Electrical Properties | | | | | | | | |
| (Ansi-Nema Std. Publ. MW1000-1977) | | | | | | | | |
| Dielectric Breakdown | 5100/6600 | 2900/4200 | 4000/4800 | 4100/5100 | 4600/5300 | 4000/4900 | 6100/6400 | 4900/5600 |
| Continuity @ V-DC (Faults/100 Ft) | 1-9 | 4-23 | 0-8 | 1-17 | 2-9 | 3-8 | 8-9 | 5-11 |
| | (1000 V) | (1500 V) | (1000 V) | (1000 V) | (1500 V) | (1500 V) | (3000 V) | (3000 V) |

| | Ex. 41 | Ex. 42 | Ex. 43 | Ex. 44 | Ex. 45 | Ex. 46 | Ex. 47 | Ex. 48 |
|---|---|---|---|---|---|---|---|---|
| Flowable Material | Tefzel 280 | Nylon | Nylon | Dacron | Dacron | Elexar | Dacron | Nylon |
| Wire Size | 18 Copper | 25 Copper | 25 Copper | 18 Copper | 25 Copper | 18 Copper | 18 Copper | 18 Copper |
| Die Size - Entry/Exit Inches | 047/049 | 025/0207 | 025/0198 | 047/0444 | 025/0209 | 054/0443 | 047/0443 | 0540/0445 |
| Die Press psi | 2000 | 800-1256 | 1079-1592 | 180-1297 754-987 | 1000 | 600-1000 | 1000-1050 | |
| Approx. Melt Temp °F. | 680 | 536 | 505 | 536-563 | 563-590 | 570 | 620 | 580 |
| Oven Temp Die °F. | 615 | 572 | 554 | 590-608 | 608-644 | 590 | 572 | 572 |
| Anneal Volts | 8.0 | 19.0-21.0 | 20 | 20-21 | 21 | 16.7 | 19 | 9.0-12.5 |
| Wire Heat Control Wheel °C. | 220 | 190 | 165-180 | 65-120 | 130-170 | 232 | 220 | 200-205 |
| Speed FPM | 100 | 600 | 600 | 600 | 600 | 400 | 400 | 300-400 |
| Physical Properties | | | | | | | | |

TABLE 1-continued

| | | | | | | | | |
|---|---|---|---|---|---|---|---|---|
| (Ansi-Nema Std. Publ. MW1000-1977) | | | | | | | | |
| Build Inches | 0088-0093 | 0021-0024 | 0014-0017 | 0032-0037 | 0021-0025 | 0031-0033 | 0030-0031 | 0026-0033 |
| Smoothness Base Coat | Good | Good | Good | Good | Good | Good | Good | Good |
| Elongation % | 31-33.5 | 24-31 | 28-31 | 27-35 | 25-28 | 28-31 | 29-31 | 30-34 |
| Flexibility 1X BP-1X | OK | OK | OK | OK | OK | OK | OK | |
| Flexibility BP-1X | | | | | | | | OK |
| Snap | OK | OK | OK | OK | OK | OK | OK | OK |
| Slit Twist | 0 | 242-377 | 200-275 | 206-254 | 254-300+ | 70 | 240 | 190-206 |
| Approx. Wire Temp °F. | 500-600 | 400-475 | 425-475 | 350-450 | 375-425 | 375-425 | 375-425 | 550-650 |
| Electrical Properties (Ansi-Nema Std. Publ. MW1000-1977) | | | | | | | | |
| Dielectric Breakdown | 16000/19000 | 4700/6000 | 4100/4400 | 9900/15100 | 6600/10800 | 7000/7800 | 10100/10900 | 4900/5700 |
| Continuity @ V-DC (Faults/100 Ft) | 1 (3000 V) | 1-28 (3000 V) | 3-13 (3000 V) | 0-6 (3000 V) | 0-11 (3000 V) | 9-11 (3000 V) | 6-7 (3000 V) | 9-14 3000 V |
| | Ex. 49 | Ex. 50 | Ex. 51 | Ex. 52 | Ex. 53 | Ex. 54 | Ex. 55 | Ex. 56 |
| Flowable Material | Halar 500 | Polyethylenesul-fone | Nylon | Nylon | Tefzel 200 | Tefzel 280 | Nylon | Nylon |
| Wire Size | 16 Copper | 16 Copper | 18 Copper | 18 Copper | 16 Copper | 16 Copper | 18 Copper | 18 Copper |
| Die Size - Entry/Exit Inches | 064/063 | 064/063 | 0540/0442 | 0460/0445 | 0640/0630 | 0640/0630 | 0540/0445 | 0540/0443 |
| Die Press psi | 500-1500 | 500-2100 | 850-1050 | 850-1050 | 1450-1550 | 1000-2000 | 900-1100 | 700-800 |
| Approx. Melt Temp °F. | 580 | 650-670 | 530 | 509 | 590 | 585-620 | 510 | 560 |
| Oven Temp Die °F. | 572 | 644-662 | 518 | 518 | 590 | 590-626 | 518 | 554 |
| Anneal Volts | 4.0-7.0 | 4.5-7.0 | 8.0-10.0 | 8.6 | 4.0-6.0 | 4.0-6.0 | 8.0-8.6 | 15.5 |
| Wire Heat Control Wheel °C. | 190-290 | 190-290 | 175-200 | 170 | 180-225 | 180-250 | 175-185 | 152-175 |
| Speed FPM | 100 | 100 | 400 | 400 | 100 | 100 | 400 | 400 |
| Physical Properties (Ansi-Nema Std. Publ. MW1000-1977) | | | | | | | | |
| Build Inches | 0079-0120 | 0095-0123 | 0030-0031 | 0031-0032 | 0119-0137 | 0105-0194 | 0031-0032 | 0035-0036 |
| Smoothness Base Coat | Good | Good | Good | Good | Good | Good | Good | Good |
| Elongation % | 23-35 | 22-33 | 27-35 | 30-34 | 25-36 | 22-37 | 25-34 | 27-30 |
| Flexibility BP-1X | OK | OK | OK | OK | OK | OK | OK | OK |
| Snap | OK | OK | OK | OK | OK | OK | OK | OK |
| Slit Twist | 143-189 | 0 | 202-208 | 207 | 0 | 0 | 172-184 | 119-142 |
| Approx. Wire Temp °F. | 225-500 | 225-500 | 500-650 | 525-625 | 225-425 | 225-425 | 500-600 | 325-375 |
| Electrical Properties (Ansi-Nema Std. Publ. MW1000-1977) | | | | | | | | |
| Dielectric Breakdown | 13500/2000 | 11400/2000 | 4800/6700 | 5800/6800 | 20,000+ | 19900/2000+ | 4800/5800 | 1600/9200 |
| Continuity @ V-DC (Faults/100 Ft) 3000 V | 1-5 | 1-22 | 4-10 | 3 | 2-4 | 1 | 2-7 | 7-10 |
| | Ex. 57 | Ex. 58 | Ex. 59 | Ex. 60 | Ex. 61 | Ex. 62 | Ex. 63 | Ex. 64 |
| Flowable Material | Nylon | Nylon | Nylon | Dacron | Dacron | Dacron | Gafite 16022 | Gafite 16000 |
| Wire Size | 24 Copper | 15 Copper | 30 Copper | 18 Copper | 18 Copper | 18 Copper | 18 Copper | 18 Copper |
| Die Size - Entry/Exit Inches | 0300/0222 | 064/062 | 0141/0125 | 054/0443 | 054/0443 | 054/0443 | 054/0443 | 054/0043 |
| Die Press psi | 500-1050 | 950-1050 | 600-750 | 400-900 | 650-1000 | 250-900 | 900-1000 | 950-1100 |
| Approx. Melt Temp °F. | 540 | 550 | 540-550 | 550 | 550 | 550 | 550 | 550 |
| Oven Temp Die °F. | 518 | 572 | 572 | 572 | 572 | 572 | 572 | 572 |
| Anneal Volts | 16.0-18.0 | 16.5-17.5 | 16.7-21.4 | 16.7 | 16.7 | 16.7 | 16.7 | 16.7 |
| Wire Heat Control Wheel °C. | 235 | 180-185 | 230 | 230 | 230 | 230 | 230 | 230 |
| Speed FPM | 400 | 400 | 400-700 | 400 | 400 | 400 | 400 | 400 |
| Physical Properties | | | | | | | | |

TABLE 1-continued

| (Ansi-Nema Std. Publ. MW1000-1977) | | | | | | | | |
|---|---|---|---|---|---|---|---|---|
| Build Inches | 0016-0017 | 0039-0041 | 0021-0022 | 0030-0032 | 0031-0032 | 0029-0031 | 0031-0032 | 0032-0033 |
| Smoothness Base Coat | Good | Good | Good | Good | Good | Good | Good | Good |
| Elongation % | 27-29.5 | 31.5-35 | 21-28 | 29-21 | 29-32 | 29-32.5 | 30-32.5 | 29-31 |
| Flexibility BP-1X | OK | OK | OK | OK | OK | OK | OK | OK |
| Snap | OK | OK | OK | OK | OK | OK | OK | OK |
| Slit Twist | 260-320 | 131-148 | 190-230 | 245-273 | 267-273 | 225-268 | 240 | 200 |
| Approx. Wire Temp °F. | 400-450 | 375-540 | 400-550 | 375-425 | 375-425 | 375-425 | 375-425 | 375-425 |
| Electrical Properties | | | | | | | | |
| (Ansi-Nema Std. Publ. MW1000-1977) | | | | | | | | |
| Dielectric Breakdown | 3060/5000 | 7400/8900 | 3400/4000 | 8100/9100 | 7100/12300 | 8400/16600 | 8000/12100 | 8600/11100 |
| Continuity @ V-DC (Faults/100 Ft) | 2-8 | 5-15 | 0-11 | 0-8 | 2-6 | 4 | 3 | 6 |
| 3000 V | (1500 V) | | (1500 V) | | | | | |

*previously coated with polyester
**previously coated with polyvinyl formal
***previously coated with amide-imide
****Tinned

What is claimed is:

1. An apparatus for the manufacture of coated filaments such as magnet wire comprising a die apparatus, a filament pay-out device, a coated filament take-up device, said die apparatus being positioned between said pay-out and take-up devices to receive a moving filament trained from said pay-out device to said take-up device, said die apparatus including an entrance die and exit die and a die block, said die block being between said dies, said entrance die having an entrance opening and an exit opening, said entrance die having a throat portion and a diverging interior wall portion, said throat portion being smaller than said exit opening, said throat portion being larger than said filament, said throat portion being connected to said entrance opening, said throat portion being connected by said diverging interior wall portion to said exit opening, said exit die having an entrance opening and an exit opening, said exit die having a throat portion and a converging interior wall portion, said throat portion being smaller than said entrance opening, said throat portion being larger than said filament, said throat portion being connected to said exit opening, said throat portion being connected by said converging interior wall portion to said entrance opening, said die block having an interior passage communicating with said exit opening of said entrance die and said entrance opening of said exit die, said diverging interior wall portion of said entrance die and said interior passage of said die block and said converging interior wall portion of said exit die defining together a die chamber, said die chamber being fillable with flowable but hardenable material, said flowable material in said die chamber supporting said filament within said die apparatus concentricly of said throat portion of said exit die, a reservoir of said flowable material, operatively connected to said die apparatus for filling said central die chamber with said flowable material, said reservoir maintaining said flowable material within said die chamber at elevated pressures.

2. The apparatus of claim 1 including a filament heater disposed between said pay-out device and said die apparatus.

3. The apparatus of claim 2 wherein said filament heater heats said filament from about ambient temperature to about the decomposition temperature of said material at a position just prior to said filament entering said die apparatus.

4. The apparatus of claim 1 including a filament heater between said pay-out device and said die apparatus, a die heater, and a reservoir material heater.

5. The apparatus of claim 4 further comprising means including said filament and die apparatus and reservoir heaters for controlling the viscosity of said material in said die chamber.

6. The apparatus of claim 5 further comprising a take-up device driver, and a pay-out device brake.

7. The apparatus of claim 6 including means for hardening said material on said filament between said die apparatus and said take-up device.

8. The apparatus of claim 2 wherein said filament is selected from the group consisting of bare copper and bare aluminum conductors, and said filament heater includes a filament annealer.

9. The apparatus of claim 7 wherein said die apparatus, filling and maintaining means, and hardening means comprises a filament coating station, and wherein said apparatus includes a plurality of said coating stations in a spaced-apart relationship to each other and said take-up and pay-out devices.

10. The apparatus of claim 8 further comprising means for drawing said conductor into a conductor of smaller size, said drawing means being positioned between said pay-out device and said filament heater.

11. The apparatus of claim 1 wherein said reservoir pressurizes said material within said die chamber to pressures up to about 2,000 psi.

12. The apparatus of claim 1 including a second die apparatus located between said pay-out and take-up devices, said second die apparatus including entrance and exit dies and a die block, said die block being between said dies, said entrance die having an entrance opening and an exit opening, said entrance die having a throat portion and a diverging interior wall portion, said throat portion being smaller than said exit opening, said throat portion being larger than said filament, said throat portion being connected to said entrance opening, said throat portion being connected by said diverging interior wall portion to said exit opening, said exit die having an entrance opening and an exit opening, said exit die having a throat portion and a converging interior wall portion, said throat portion being smaller than said entrance opening, said throat portion being larger than said filament, said throat portion being connected to said exit opening, said throat portion being connected by said converging interior wall portion to said entrance opening, said die block having an interior passage communicating with said exit opening of said entrance die and said entrance opening of said exit die, said diverging interior wall portion of said entrance die and said interior passage of said die block and said converging interior wall portion of said exit die defining together a die chamber, said die chamber being fillable with flowable but hardenable material, said flowable material in said die chamber supporting said filament within said die apparatus concentricly of said throat portion of said exit die.

13. An apparatus for the manufacture of coated filaments such as magnet wire comprising a die apparatus, said die apparatus including entrance and exit dies and a die block, said die block being between said dies, said entrance die having an entrance opening and an exit opening, said entrance die having a throat portion and a diverging interior wall portion, said throat portion being smaller than said exit opening, said throat portion being connected to said entrance opening, said throat portion being connected by said diverging interior wall portion to said exit opening, said exit die having an entrance opening and an exit opening, said exit die having a throat portion and a converging interior wall portion, said throat portion being smaller than said entrance opening, said throat portion being connected to said exit opening, said throat portion being connected by said converging interior wall portion to said entrance opening, said die block having an interior passage communicating with said exit opening of said entrance die and said entrance opening of said exit die, said diverging interior wall portion of said entrance die and said interior passage of said die block and said converging interior wall portion of said exit die defining together a die chamber, said die chamber being fillable with flowable but hardenable material, said flowable material in said die chamber being disposed to support a filament smaller than said throat portions of said entrance and exit dies within said die apparatus concentricly of said throat portion of said exit die.

14. An apparatus for the manufacture of coated filaments such as magnet wire comprising a filament payout device, a coated filament take-up device, and a die apparatus between said pay-out and take-up devices, to receive a moving filament trained from said pay-out device to said take-up device, said die apparatus including entrance and exit dies and a die block, said die block being between said dies, said entrance and exit dies each having an entrance opening and an exit opening, said dies each having a throat portion, a converging interior wall portion and a diverging interior wall portion between a respective said entrance opening and a respective said exit opening, said throat portions being smaller than said openings, said throat portions being connected by respective said converging interior wall portions to respective said entrance openings, said throat portions being connected by respective said diverging interior wall portions to respective said exit openings, said die block having an interior passage communicating with said exit opening of said entrance die and said entrance opening of said exit die, said diverging interior wall portion of said entrance die and said interior passage of said die block and said converging interior wall portion of said exit die defining together a die chamber, said die chamber being fillable with flowable but hardenable material, to support a filament within said die apparatus concentricly of said throat portion of said exit die, said throat portions being larger than said filament and being interspaced from said filament when said filament is supported by said flowable material in said die chamber, said throat portions being sufficiently small to maintain said flowable material at elevated temperatures and pressures in said die chamber, and a reservoir for said flowable material operatively connected to said die apparatus for filling said die chamber with said flowable material and maintaining said supply of flowable material within said die chamber at elevated pressures.

* * * * *